Sept. 13, 1955   C. F. BETHEA ET AL   2,717,658
CARBON BLACK COLLECTING AND SEPARATING
PROCESS AND APPARATUS
Filed Jan. 2, 1952
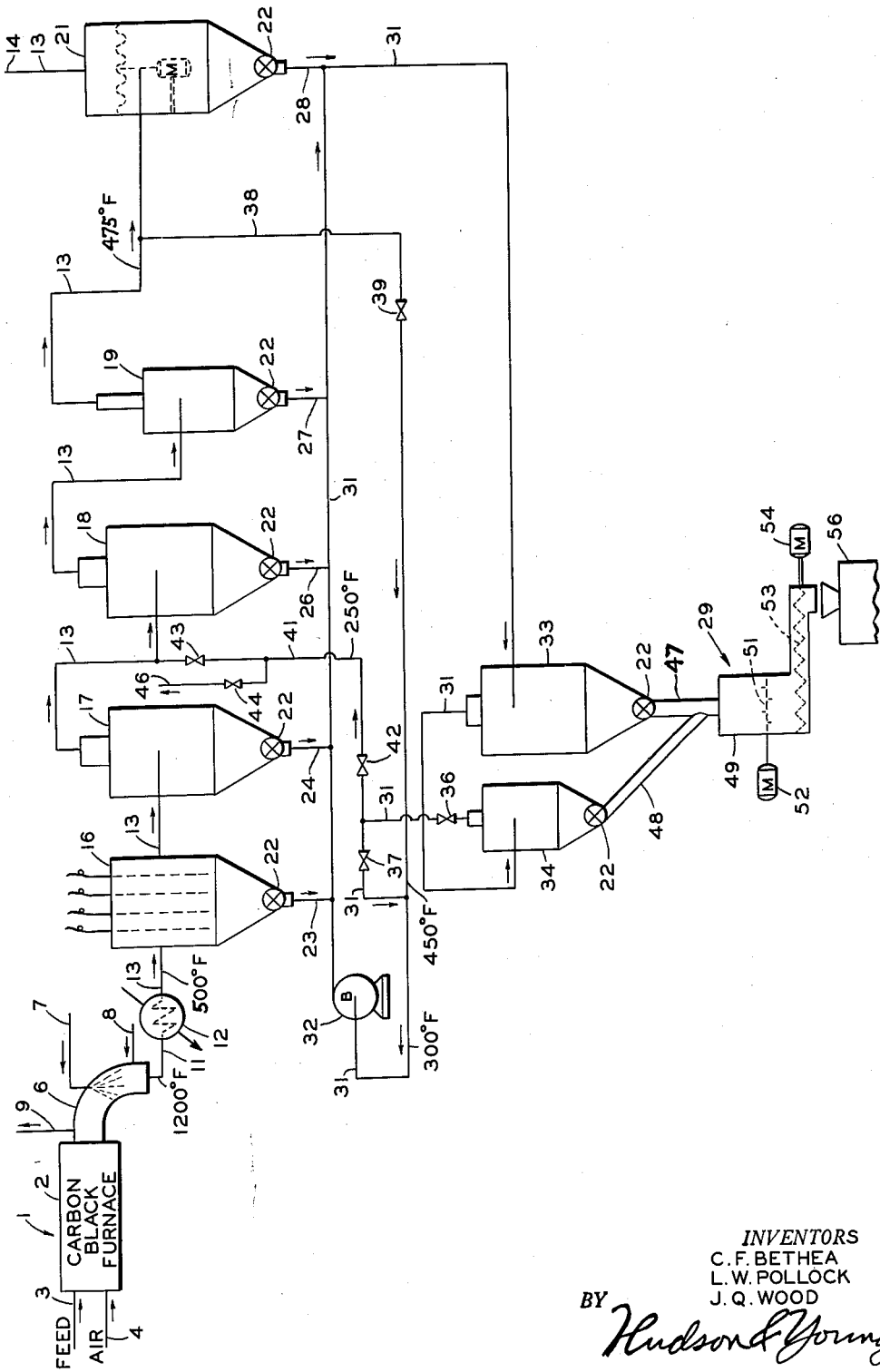
INVENTORS
C. F. BETHEA
L. W. POLLOCK
J. Q. WOOD
BY Hudson & Young
ATTORNEYS

United States Patent Office 2,717,658
Patented Sept. 13, 1955

---

2,717,658

CARBON BLACK COLLECTING AND SEPARATING PROCESS AND APPARATUS

Charles F. Bethea, Lyle W. Pollock, and James Q. Wood, Bartlesville, Okla., assignors to Phillips Petroleum Company, a corporation of Delaware Application January 2, 1952, Serial No. 264,478

22 Claims. (Cl. 183—34)

This invention relates to processes for collecting carbon black and apparatus for carrying out said processes. In one specific aspect it relates to a process for separating suspended carbon black from a hot gaseous effluent containing gas, water vapor, and said suspended carbon black at a temperature above 210° F. In another aspect it relates to pneumatically collecting and conveying carbon black. In another aspect it relates to separating carbon black from gases pneumatically conveying the same. In another aspect it relates to apparatus for carrying out all the above mentioned processes.

In the prior art of producing carbon black, in furnaces, a hot gaseous effluent containing gas, water vapor and suspended carbon black is produced at temperatures above 210° F., generally coming from the furnace in the neighborhood of 1200° F. although at some points in the furnace during the carbon black making process, it may have been at a temperature as high as from 2000° F. to 4000° F. It is extremely difficult to separate this suspended carbon black from the remaining gases and water vapor, especially if it is attempted to separate the same in one step. As a result most plants separate the carbon black in a series of steps, it being common to cool the gaseous effluent to about 500° F., and then run the same in series through a plurality of separation means, such as first through an electrical precipitator, then through primary, secondary and tertiary cyclone separators. Originally only primary and secondary cyclone separators were employed, but an excessive amount of product was being wasted and so the tertiary cyclone separators were put in to recover some of that product. Due to a desire to be good neighbors, the industries often now put in a fifth separation step, chiefly for the purpose of smoke abatement, and this fifth step may be to pass the smoke through cloth, or woven glass fabric bags, or to water-wash the same, for the purpose of final smoke abatement. As a result, the separated carbon black is at first located at a plurality of separated points, namely at the bottom of each one of these different types of separators, and it is necessary to collect the same and bring the same to one bin. Mechanical screw conveyors and belt conveyors have been employed, but they are generally a very expensive installation yet subject to frequent break-downs and service requirements. Pneumatic conveying of the carbon black with air is dangerous because of the explosion hazard created, especially if air leaks into the gas, or gas leaks out into the air by leakage in either direction through star valves, such as 22. Many other objections to these processes of the prior art are known to those skilled in the art.

The present invention avoids the difficulties of the prior art by employing the waste gases of the carbon black making process to convey the carbon black, such gases heretofore having been regarded as unfit for any such purpose because of their water vapor content, by keeping the entire system ahead of the point at which the waste gases finally deposit the carbon black above the dew point of 175° F. of said waste gases. Enough hot gases are added to the system to keep the temperature above the dew point and enough of these gases are recycled to control the temperature at the desired temperature level.

One object of the present invention is to provide an improved process for the collection of carbon black, and apparatus of an improved nature for carrying out the said process.

Another object is to provide an improved process of separating, conveying and collecting carbon black from a hot gaseous effluent containing gas, water vapor and suspended carbon black.

Another object is to provide a carbon black separating and conveying system suitable for handling carbon black coming from a hot gaseous effluent containing gas, water vapor and suspended carbon black.

Numerous other objects and advantages will be apparent to those skilled in the art upon reading the accompanying specification, claims and drawing.

The single figure in the drawing is a diagrammatic elevation of a carbon black manufacturing plant embodying the present invention, with the various pieces of apparatus shown by conventional symbols.

In the drawing a carbon black furnace generally designated as 1 can be any of the many types of carbon black furnaces which produce a hot gaseous effluent containing gas, water vapor, and suspended carbon black at a temperature above 210° F. The furnace chamber 2 may produce the carbon black from any carbonaceous material, usually gaseous or liquid hydrocarbons, shown entering as feed at 3, by anyone of a number of pyrochemical processes, such as exposure to radiant heat alone, incomplete combustion of the feed, or exposure to hot combustion gases with or without partial incomplete combustion with added free oxygen containing gas such as air 4. The furnace 1 may, if desired, include a quench section 6, because in some processes the quality of the carbon black is improved by stopping the reaction more or less rapidly with a direct water spray injection. Often temperatures of from 2000° F. to 4000° F. may be obtained in furnace 2 and reactions often continue when the temperature of the effluent gas is still above about 1600° F. Quench section 6 may merely be indirect heat exchange with the atmosphere, but in the drawing a direct water spray quench 7 is shown which quenches the effluent rapidly down to about 1000° F. to 1600° F. and thereby adding water vapor to the gaseous effluent, although generally there is a large amount of water vapor in said effluent anyhow, even without the use of the water spray 7. If desired, there may be indirect heat exchange with cold water coming in through pipe 8, passing through a jacket of 6 and emerging as warm water through pipe 9, or the water can emerge from 9 as steam.

Gaseous effluent in pipe 11 therefore is generally below 1600° F., for example, 1200° F. is indicated. This temperature is somewhat hotter than is conducive to long life and proper operation of the usual carbon black separation means and therefore it is conventional to cool the same to the neighborhood of about 600° F. before separating the carbon black out, by indirect heat exchange with the atmosphere or other fluids at 12, which may merely consist of a long pipe exposed to the air, and/or by further direct injection of water spray (not shown) so that the gaseous effluent entering discharge conduit 13 may have a temperature in the neighborhood of 500° F.

The discharge conduit 13 is shown extending all the way across the top of the drawing, connecting the source of hot gaseous effluent 2 with an outlet 14 downstream therefrom. Discharge conduit 13 therefore includes quench section 6, pipe 11 and heat exchanger 12 as portions of said discharge conduit 13. In discharge conduit 13 are arranged in series a number of carbon black separators 16 to 19 and 21, each one for separating some of the carbon black from some of the gas and water vapor of said effluent. Many different types of these separators are known in the art and may be arranged in any desired configuration. Most of these separators are dry separators, and it is an object of the present invention to collect the carbon black from the bottom of each of the dry separators. Sometimes one or more of the separators may be of the wet type (not shown) in which the gaseous effluent is washed with water spray which does not completely evaporate but which forms a slurry (not shown), and if one or more of these is employed in practicing the present invention, the carbon black slurry from the same is merely not collected by the present system but is carried off (by means not shown) to some disposal system known to the prior art and the present invention relates only to collecting the carbon black from the dry separation steps. The aqueous carbon black slurry (not shown) coming from the wet separation steps (not shown) may be disposed of by adding the same to quench 7 where it will be evaporated back into the dry suspended carbon black, or it may be used for wet pelleting other carbon blacks (not shown) or it may be used as a separate product (not shown).

A number of dry separators and dry separating systems are known. One particularly effective combination is to have an electrical precipitator 16 and then a primary cyclone separator 17, a secondary cyclone separator 18, a tertiary cyclone separator 19, and (if desired) to practice smoke abatement a bag filter 21 in the series as shown in the drawing. However, it should be understood that sonic separators, for example, of the siren or turbine type (not shown) and other types of dry separators known to the prior art, may be employed in place of dry separation steps 16 to 19 and 21, shown in the drawing. Also for any one of these dry steps, a wet step (not shown) may be substituted, the collection system to be described below merely passing by the wet step in collecting from the dry steps. For these wet separation steps the usual slot scrubbers, water washers and wet precipitators (all not shown) of the prior art may be employed in combination with a plurality of dry steps, in the practice of this invention.

In each of the carbon black separators 16 to 19 and 21 a certain amount of carbon black gathers in the bottom of the separator, and the gaseous effluent relieved of that amount of the carbon black passes on to the next separator. In the system shown probably more carbon black is deposited in the bottom of primary cyclone 17 than in any of the other separators, but there is still considerable amounts in the other separators which needs to be collected. Because of the dimensions and overall engineering requirements in designing such a plant, the lower portions of separators 16 to 19 and 21 are oftentimes quite widely spaced apart.

In the lower portion of each of the separators 16 to 19 and 21 is located a conventional gas lock valve, or chemical feeder device 22, which may be a star valve as conventionally shown in the drawings by a symbol. This star valve is a device similar to a revolving door, each section of which takes a measured amount of the carbon black deposited as a powder in the bottom of the respective bins 16 to 19 or 21, and in revolving, passes it to its respective outlet conduit, such as 23, generally by gravity. Depending on whether the pressure in the bin 16 is higher than in the line 23 or vice versa, a certain amount of the gas also passes through valve 22 as it revolves, but only a very small amount of gas can enter each section, especially when there is a considerable pile of powdered carbon black available for transfer. Valve 22 therefore acts as a gas lock and drastically limits the amount of gas which can pass therethrough. Without such valve 22 large amounts of gas would be passed whenever the head of carbon black in the chamber was low. However, when there is a sufficient head of carbon black powder in any of chambers 16 to 19 and 21, it is possible to practice the invention without a carbon black discharge valve 22 in the bottom of the bin, because a sufficient amount of powdered carbon black in the bottom of the bin will act in effect like a valve, allowing the passage of mostly powdered carbon black and relatively small amounts of gas. Furthermore, gas discharge valves 22 may be ordinary gate valves which are only opened when it is known that there is a sufficient head of powdered carbon black above them to permit proper operation as described in the last sentences. However, it is greatly preferred to have gas lock type valves 22 rather than to use ordinary gate valves, or to eliminate these valves entirely, because with gas lock type valves such as star valves 22 there is then entirely automatic control, and no question of manipulation, or of whether there is a sufficient head of powdered carbon black in the bins for proper operation to require any judgment on the part of, or take the time of, the operator. In order to collect the carbon black from each of the conduits 23, 24, and 26 to 28 and convey the same to a central point of collection generally designated as 29 a collection conduit 31 is provided, connected to each of said outlet conduits. While collection conduit 31 could merely extend from the outlet conduits to the central point of collection 29, it is preferred to have conduit 31 endless, that is, extending in a circle and meeting itself, and the various pipes forming portions of conduit 31 are so indicated on the drawing. In the preferred embodiment shown, there are arranged in series in conduit 31, a gas blower or pump of any type known to the prior art 32, connections with outlet conduits 23, 24 and 26 to 28, one or more dry separators 33, 34 (shown as cyclone separators) and, if desired, gas flow control valves 36 and 37.

In order to supply hot gas to use as the conveying fluid in the collection conduit 31, a gas inlet conduit 38 is provided connecting any point of said pipe 11 or of said discharge conduit 13 downstream of said quench 7 (provided that the temperature of the hot gaseous effluent in said discharge conduit 13 at that point is above 210° F.), with any point of said collection conduit 31 upstream of collector 34 and upstream of blower 32 which point is also downstream of pipe 41 and separated from pipe 41 by a pressure drop represented by valve 37. In some of these furnace carbon black processes there is no quench 7. Whether quench 7 is present, or not, pipe 38 could take hot gases from pipe 6, upstream of the quench 7 if there is one, or even from the latter part of furnace 2, and due to the high heat could operate pipe 31 with a very small input through pipe 38. Because the function of adding the gas through 38 to 31 and bleeding it off through 41 is to add heat enough to collection pipe 31 to prevent deposit of moisture, the hotter the added gases are, the less volume need be added, and vice versa. However, if there is a quench 7, and that quench improves the quality of the carbon black as it often does, then it might be unwise to take the hot gas containing unfinished carbon black from above quench 7 because it would have to mix finally with the other properly finished carbon black and might be in sufficient quantity and poor enough in quality to decrease the average quality of the ultimate mixture.

The discharge conduit 13 can be regarded therefore as including pipes 11 and 6 when and if off take pipe 38 is connected with 11 or with 6 above or below quench 7, whether indirect heat exchange cooling 8, 9 and 12 and/or quench 7 are used or not. While pipe 38 therefore could be connected to pipes 11 or 13 anywhere from furnace 2 above the quench 7 to the extreme end 14 of pipe 13, it is in some instances desirable to connect pipe 38 to pipe 13 after the tertiary cyclone 19 and before the bag filter 21, where the temperature in the particular embodiment illustrated is about 475° F. One advantage of this point of connection is that the gas passing through the pipes 38 and 31 into the blower 32 contains less solids than would be the case at any other point of conection with 13 except downstream of bag filter 21. Connection downstream of bag filter 21 is also quite operative, but there is a considerable drop in temperature and pressure in the gas going through the bag filter, and there is also relatively little carbon black in the gas in pipe 13 to be removed by the bag filter. As both the temperature and the pressure downstream of the bag filter are lower and the carbon black content is already very low upstream of the bag filter, it is preferable in some instances to connect pipe 38 as shown in the drawing, but as stated above it can be connected anywhere from furnace 2 to end 14. Also pipe 38 may be branched and one branch collect part of the gas as very hot gas from pipe 11 and part of the gas as cooled gas with less carbon content from pipe 31 between 18 and 19, for example.

The amount of hot gas entering collection conduit 31 through inlet conduit 38 may be controlled, if desired, by valve 39.

Approximately the same amount of gas as is entering the line 31 through line 38 including the gain, or loss through star valves 22 as the case may be, is removed from the collection conduit at a lower temperature through a bleed conduit 41 connected to said collection conduit 31 at any point downstream of at least one of said separators 33 or 34 and upstream of all of said outlet conduits 23, 24 and 26 to 28 and connected to said discharge conduit 13 upstream of at least one of said separators 16 to 19 and 21 therein. The amount of gas flowing through bleed conduit 41 can be controlled by valves 36 and 37 alone, or in combination with a valve 42 which may be provided for this purpose. As the gas entering pipe 41 from line 31 comes from the separator 33 and/or 34, and as said collection system 33 and/or 34 is operating on a gas that is highly loaded with somewhat compacted carbon black which is much easier to remove from pipe 31 than it is from the original gaseous effluent in pipe 13, there should be relatively little carbon black in pipe 41, therefore it is within the scope of the present invention to not return gas 41 to discharge conduit 13 through valve 43, but instead to close valve 43 and open valve 44 allowing gas from bleed conduit 41 to pass out through a separate vent 46 to the atmosphere, to gas burners (not shown) or for any other use. In most instances, however, it is advisable to return the bleed conduit to discharge conduit 13 with valve 43 open and valve 44 closed so that in case some accident causes a momentary objectionable amount of carbon black in pipe 41 it will not escape to the atmosphere, or to burners or the like (not shown) at 46. But 41 can bleed to any point in lines 6, 11, 12 and 13 from furnace 2 to 14.

While two dry separators 33 and 34 in series are preferred, it should be understood that in some instances only one dry separator 33 is necessary and 34 can be eliminated due to the easy separation properties of the carbon black which has been deposited as a powder in the bottom of bins 16 to 19 and 21 before being conveyed with gas into separator 33. However, if desired, more dry separation steps could be added to 33 and 34, which have some safety factor value if the gas is bled off through line 46 to some special use, such as burning in a burner (not shown).

From the separation step 33 and/or 34, the carbon black passes through pipes 47 and 48, which are preferably provided with valves 22, although the conditions, amount and head of carbon black at these points, may make valves 22 unnecessary, into a central place of collection generally designated as 29. The separators 33 and 34 generally are so close together compared to the spacing of outlets 23, 24 and 26 to 28 that when the carbon black is in 33 and 34, it may be considered as substantially at a central point of collection 29.

While no part of the present invention, it is then customary to collect the carbon black in a surge tank 49, pass the same through a micropulverizer 51 driven by a motor 52, and then dispense the same by a dispensing device 53 driven by motor 54 into pellet mills (not shown), storage bins (not shown), or freight car 56 for storage, or transportation to the ultimate consumer. During normal flow of carbon black the carbon black carries enough heat with it to keep the temperature above the dew point of about 175° F. until after the micropulverizer 51 has been passed, or until pelleted in the pellet mills (not shown). After being pelleted, or placed in freight car 56 in either pelleted or unpelleted form it is no longer essential to maintain the carbon black above the dew point, as the moisture will not hurt it then.

*Operation*

In the preferred embodiment shown in the drawing, a hot gaseous effluent containing gas, water vapor and suspended carbon black, emerges from furnace 1 through pipe 11 at a temperature above 210° F., which in the example chosen is about 1200° F. In the example chosen, 1200° F. is still a rather high temperature for most efficient separatory operation and/or long life of the dry separation equipment illustrated, so the temperature is lowered in heat exchanger 12 to about 500° F. when it enters discharge conduit 13. Such gases have a dew point of about 175° F. While other separation steps may be employed, as pointed out in detail above, in the preferred embodiment the gaseous effluent enters an electrical precipitator 16 first. Precipitator 16 actually precipitates a relatively minor part of the carbon black, its chief function being to cause smaller particles of carbon black to agglomerate by electrical attraction into larger particles which can be removed by such processes as cyclone separation, which latter processes would be less effective on the original carbon black particles before they entered precipitator 16. Some carbon black precipitates to the bottom of 16. The remaining gaseous effluent passes then into cyclone separator 17 which generally removes the bulk of the carbon black remaining, but there is still a large quantity of carbon black in the gaseous effluent. The major portion of that remaining is removed in secondary cyclone 18 and accumulates in the bottom thereof as a flocculent powder. Further carbon black removal is similarly practiced in cyclone separator 19 and in the bag filter 21. The gas emerging from bag filter 21 through pipe 13 contains substantially no visible amount of carbon black and is discharged to the atmosphere through vent 14, or may be employed as heating gas, synthesis gas, or the like (such employment not shown) because it does have a certain value for these purposes in some locations. In such locations as the Texas Panhandle, where there is ample gas available from other sources this gas may be merely vented to the atmosphere at 14 because its high water vapor, nitrogen and carbon dioxide content make it a relatively poor gas compared to straight methane.

At the point where gas inlet line 38 draws gas from discharge line 13 the temperature may be 475° as indicated, but by the time this gas enters line 31 the temperature may be 450° F. In order for the system to be operative it is necessary that all points of the system to which the gas in conveying conduit 31 has access be at all times above the dew point, which is about 175° F. for such gases, but obviously a considerable margin of safety is to be preferred. At the same time it is not desirable to overheat blower 32. Therefore it is preferred to take in enough gas at 475° F. through line 38 and to discharge enough gas at about 250° F. at line 41, the two quantities of gas being substantially equal, to maintain a working temperature of about 300° F. in the endless collection conduit 31, which may be expressed as stating that the gas therein is above, or at least, 250° F. This insures that collectors 33 and 34, pipes 47 and 48, micropulverizer 51 and pipe 53 will remain above 175° F. The temperature after leaving pipe 53 is of no concern because the gas content and water vapor therein is small and the carbon black is in a form that will not be damaged thereby.

Gas blown by blower 32 picks up the loose carbon black from outlets 23, 24 and 26 to 28 and carries the same into separators 33 and 34, if 34 is present.

The object of collection at a central point generally designated as 29 is therefore accomplished in separators 33 and 34 and the gas is passed on back to blower 32.

Obviously by closing valve 37 and opening valve 42 wide open the endless nature of collection conduit 31 may be eliminated and gas passing from pipe 38 into 31 will pass once through blower 32 and the remainder of the collection system, out pipe 41, back into discharge conduit 13 if valve 44 is closed and 43 is open; or if valve 43 is closed and valve 44 is open, it will pass entirely out of the system through vent 46. These operations in the last sentence also embody the present invention, although they are not the most preferred embodiment. Similarly it is possible to practice the invention with blower 32 in line 31 downstream of one or more of the outlet pipes 23, 24 and 26 to 28 and upstream of either or both of separators 33 and 34, and/or downstream of said separators 33 and/or 34 but upstream of pressure drop valve 37 and operate by vacuum collection in either an endles collection conduit 31 with valve 37 open, or in a once through system with valve 37 closed, obviously in all cases with the blower 32 in line 31 either upsstream of the point of entry of bleed conduit 41 or downstream of the same and separated therefrom by a pressure drop such as 37 may provide and with blower 32 in line 31 downstream of the point of entry of inlet conduit 38. Any modification which locates blower 32 so that it has to handle gases heavily laden with carbon black from outlets 23, 24, 26, 27 and/or 28, or so that a vacuum is pulled in any large container with sheet metal walls, such as separators 33 and 34, has obvious disadvantages in these respects to the preferred modification shown in the drawings.

While a certain specific embodiment has been shown in the drawings and described in the specification for purposes of illustrating the invention, the invention is not limited thereto.

Having described our invention we claim:

1. A carbon black separating and conveying system comprising in combination a source of hot gaseous effluent containing gas, water vapor and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, a carbon black discharge valve controlling flow of carbon black through each of said outlet conduits, an endless collection conduit connected to a plurality of said outlet conduits, a gas inlet conduit connecting said collection conduit to said discharge conduit at a point in said discharge conduit downstream of at least one of the separators therein where the temperature of the hot gaseous effluent therein is above 210° F. to supply some of said gaseous effluent from said discharge conduit to said collection conduit, a gas blower connected in said collection conduit disposed to blow the effluent therein and carbon black from said outlet conduits downstream through said collection conduit, a plurality of carbon black separators connected in series in said collection conduit downstream of said outlet conduits for separating some of the carbon black from some of the gas in said collection conduit, and a bleed conduit connected to said collection conduit downstream of at least one of said separators therein connecting it to said discharge conduit upstream of at least one of said separators therein.

2. A carbon black separating and conveying system comprising in combination a source of hot gaseous effluent containing gas, water vapor, and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, a carbon black discharge valve controlling flow of carbon black through each of said outlet conduits, a collection conduit connected to a plurality of said outlet conduits, a gas inlet conduit connecting said collection conduit to said discharge conduit at a point in said discharge conduit downstream of at least one of the separators therein where the temperature of the hot gaseous effluent therein is above 210° F. to supply some of said gaseous effluent from said discharge conduit to said collection conduit, a gas blower connected in said collection conduit disposed to blow the effluent therein and carbon black from said outlet conduits downstream through said collection conduit, a plurality of carbon black separators connected in series in said collection conduit downstream of said outlet conduits for separating some of the carbon black from some of the gas in said collection conduit, and a bleed conduit connected to said collection conduit downstream of at least one of said separators therein connecting it to said discharge conduit upstream of at least one of said separators therein.

3. A carbon black separating and conveying system comprising in combination a source of hot gaseous effluent containing gas, water vapor, and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, a carbon black discharge valve controlling flow of carbon black through each of said outlet conduits, an endless collection conduit connected to a plurality of said outlet conduits, a gas inlet conduit connecting said collection conduit to said discharge conduit at a point in said discharge conduit downstream of at least one of the separators therein where the temperature of the hot gaseous effluent therein is above 210° F. to supply some of said gaseous effluent from said discharge conduit to said collection conduit, a gas blower connected in said collection conduit disposed to blow the effluent therein and carbon black from said outlet conduits downstream through said collection conduit, a carbon black separator connected in series in said collection conduit downstream of said outlet conduits for separating some of the carbon black from some of the gas in said collection conduit, and a bleed conduit connected to said collection conduit downstream of said separator therein connecting it to said discharge conduit upstream of at least one of said separators therein.

4. A carbon black separating and conveying system comprising in combination, a source of hot gaseous effluent containing gas, water vapor, and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, a collection conduit connected to a plurality of said outlet conduits, a gas inlet conduit connecting said collection conduit to said discharge conduit at a point in said discharge conduit where the temperature of the hot gaseous effluent therein is above 210° F. to supply some of said gaseous effluent from said discharge conduit to said collection conduit, a gas blower connected in said collection conduit disposed to blow the effluent therein and carbon black from said outlet conduits downstream through said collection conduit, a carbon black separator connected in series in said collection conduit downstream of said outlet conduits for separating some of the carbon black from some of the gas in said collection conduit, and a bleed conduit connected to said collection conduit downstream of said separator therein connecting it to said discharge conduit upstream of at least one of said separators therein.

5. A carbon black separating and conveying system comprising in combination a source of hot gaseous effluent containing gas, water vapor, and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, a carbon black discharge valve controlling flow of carbon black through each of said outlet conduits, a collection conduit connected to a plurality of said outlet conduits, a gas inlet conduit connecting said collection conduit to said discharge conduit at a point in said discharge conduit downstream of at least one of the separators therein where the temperature of the hot gaseous effluent therein is above 210° F. to supply some of said gaseous effluent from said discharge conduit to said collection conduit, a gas blower connected in said collection conduit disposed to blow the effluent therein and carbon black from said outlet conduits downstream through said collection conduit, a plurality of carbon black separators connected in series in said collection conduit downstream of said outlet conduits for separating some of the carbon black from some of the gas in said collection conduit, and a bleed conduit connected to said collection conduit downstream of at least one of said separators therein.

6. A carbon black separating and conveying system comprising in combination a source of hot gaseous effluent containing gas, water vapor, and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, a carbon black discharge valve controlling flow of carbon black through each of said outlet conduits, an endless collection conduit connected to a plurality of said outlet conduits, a gas inlet conduit connecting said collection conduit to said discharge conduit at a point in said discharge conduit downstream of at least one of the separators therein where the temperature of the hot gaseous effluent therein is above 210° F. to supply some of said gaseous effluent from said discharge conduit to said collection conduit, a gas blower connected in said collection conduit disposed to blow the effluent therein and carbon black from said outlet conduits downstream through said collection conduit, a carbon black separator connected in series in said collection conduit downstream of said outlet conduits for separating some of the carbon black from some of the gas in said collection conduit, and a bleed conduit connected to said collection conduit downstream of said separator therein.

7. A carbon black separating and conveying system comprising in combination a source of hot gaseous effluent containing gas, water vapor, and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, a collection conduit connected to a plurality of said outlet conduits, a gas inlet conduit connecting said collection conduit to said discharge conduit at a point in said discharge conduit where the temperature of the hot gaseous effluent therein is above 210° F. to supply some of said gaseous effluent from said discharge conduit to said collection conduit, a gas blower connected in said collection conduit disposed to blow the effluent therein and carbon black from said outlet conduits downstream through said collection conduit, a carbon black separator connected in series in said collection conduit downstream of said outlet conduits for separating some of the carbon black from some of the gas in said collection conduit, and a bleed conduit connected to said collection conduit downstream of said separator therein.

8. A carbon black separating and conveying system comprising in combination a source of hot gaseous effluent containing gas, water vapor, and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, an endless collection conduit connected to a plurality of said outlet conduits, a gas inlet conduit connecting said collection conduit to said discharge conduit at a point in said discharge conduit downstream of at least one of the separators therein where the temperature of the hot gaseous effluent therein is above 210° F. to supply some of the said gaseous effluent from said discharge conduit to said collection conduit, a gas blower connected in said collection conduit disposed to blow the effluent therein and carbon black from said outlet conduits downstream through said collection conduit, a plurality of carbon black separators connected in series in said collection conduit downstream of said outlet conduits for separating some of the carbon black from some of the gas in said collection conduit, and a bleed conduit connected to said collection conduit downstream of at least one of said separators therein connecting it to said discharge conduit upstream of at least one of said separators therein.

9. A carbon black separating and conveying system comprising in combination a source of hot gaseous effluent containing gas, water vapor, and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, a collection conduit connected to a plurality of said outlet conduits, a gas inlet conduit connecting said collection conduit to said discharge conduit at a point in said discharge conduit downstream of at least one of the separators therein where the temperature of the hot gaseous effluent therein is above 210° F. to supply some of said gaseous effluent from said discharge conduit to said collection conduit, a gas blower connected in said collection conduit disposed to blow the effluent therein and carbon black from said outlet conduits downstream through said collection conduit, a carbon black separator connected in series in said collection conduit downstream of said outlet conduits for separating some of the carbon black from some of the gas in said collection conduit, and a bleed conduit connected to said collection conduit downstream of said separator therein connecting it to said discharge conduit upstream of at least one of said separators therein.

10. A carbon black separating and conveying system comprising in combination a source of hot gaseous effluent containing gas, water vapor, and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, an endless collection conduit connected to a plurality of said outlet conduits, a gas inlet conduit connecting said collection conduit to said discharge conduit at a point in said discharge conduit downstream of at least one of the separators therein where the temperature of the hot gaseous effluent therein is above 210° F. to supply some of said gaseous effluent from said discharge conduit to said collection conduit, a gas blower connected in said collection conduit disposed to blow the effluent therein and carbon black from said outlet conduits downstream through said collection conduit, a carbon black separator connected in series in said collection conduit downstream of said outlet conduits for separating some of the carbon black from some of the gas in said collection conduit, and a bleed conduit connected to said collection conduit downstream of said separator therein.

11. A carbon black separating and conveying system comprising in combination a source of hot gaseous effluent containing gas, water vapor, and suspended carbon black at a temperature above 210° F., a discharge conduit connecting said source with an outlet downstream therefrom, a plurality of carbon black separators for separating some of the carbon black from some of the gas and water vapor of said effluent connected in series downstream of said source in said discharge conduit, each of said separators having an outlet conduit for carbon black, a collection conduit connected to a plurality of said outlet conduits, a gas inlet conduit connecting said collection conduit to said discharge conduit at a point in said discharge conduit downstream of at least one of the separators therein where the temperature of the hot gaseous effluent therein is above 210° F. to supply some of said gaseous effluent from said discharge conduit to said collection conduit, a gas blower connected in said collection conduit disposed to blow the effluent therein and carbon black from said outlet conduits downstream through said collection conduit, a carbon black separator connected in series in said collection conduit downstream of said outlet conduits for separating some of the carbon black from some of the gas in said collection conduit, and a bleed conduit connected to said collection conduit downstream of said separator therein.

12. A carbon black separating and conveying system comprising a source of hot gaseous effluent containing gas, water vapor, and suspended carbon black at a temperature above 210° F., a discharge conduit connecting said source with an outlet downstream therefrom, a plurality of carbon black separators adapted to separate some of the carbon black from some of the gas and water vapor of said effluent and connected in series downstream of said source in said discharge conduit, each of said separators having an outlet conduit for carbon black, a collection conduit connected to a plurality of said outlet conduits, a gas inlet conduit connecting said collection conduit to said discharge conduit at a point in said discharge conduit where the temperature of the hot gaseous effluent therein is above 210° F. to supply some of said gaseous effluent from said discharge conduit to said collection conduit, a gas blower connected in said collection conduit disposed to effect passage of the effluent therein and carbon black from said outlet conduits downstream through said collection conduit, a carbon black separator in said collection conduit downstream of said outlet conduits for separating some of the carbon black from some of the gas in said collection conduit, and a bleed conduit connected to said collection conduit downstream of said separator therein.

13. A carbon black separating and conveying system comprising in combination a source of hot gaseous effluent containing gas, water vapor, and suspended carbon black at a temperature above 210° F., a discharge conduit connecting said source with an outlet downstream therefrom, a plurality of carbon black separators adapted to separate some of the carbon black from some of the gas and water vapor of said effluent and connected in series downstream of said source in said discharge conduit, each of said separators having an outlet conduit for carbon black, a collection conduit connected to a plurality of said outlet conduits, a gas inlet conduit connecting said collection conduit to said discharge conduit at a point in said discharge conduit where the temperature of the hot gaseous effluent therein is above 210° F. to supply some of the said gaseous effluent from said discharge conduit to said collection conduit, a gas blower connected in said collection conduit disposed to effect passage of the effluent therein and carbon black from said outlet conduits downstream through said collection conduit, a plurality of carbon black separators connected in series in said collection conduit downstream of said outlet conduits for separating some of the carbon black from some of the gas in said collection conduit, and a bleed conduit connected to said collection conduit downstream of at least one of said separators therein.

14. A carbon black separating and conveying system according to claim 12, in which the collection conduit connected to the outlet conduits of the separators forms an endless closed circuit.

15. A carbon black separating and conveying system according to claim 12, in which the gas inlet conduit is connected to the discharge conduit at a point in the discharge conduit downstream of at least one of the separators therein.

16. A carbon black separating and conveying system according to claim 13 in which the bleed conduit is connected to the collection conduit downstream of at least one of the separators therein and is adapted to connect the collection conduit with the discharge conduit upstream of at least one of the separators therein.

17. A carbon black separating and conveying system according to claim 12 in which each of the carbon black outlet conduits of the separators in the discharge conduit has a discharge valve, such as a star valve, for controlling the flow of carbon black therethrough.

18. A carbon black separating and conveying system comprising a source of hot gaseous effluent containing gas, water vapor, and suspended carbon black at a temperature above 210° F., a discharge conduit connecting said source with an outlet downstream therefrom, a first carbon black separator adapted to separate some of the carbon black from some of the gas and water vapor of said effluent and connected downstream of said source in said discharge conduit, said separator having an outlet conduit for carbon black, a collection conduit connected to said outlet conduit, a gas inlet conduit connecting said collection conduit to said discharge conduit at a point in said discharge conduit where the temperature of the hot gaseous effluent therein is above 210° F. to supply some of said gaseous effluent from said discharge conduit to said collection conduit, a gas blower connected in said collection conduit disposed to effect passage of the effluent therein and carbon black from said outlet conduit downstream through said collection conduit, a second carbon black separator in said collection conduit downstream of said outlet conduit for separating some of the carbon black from some of the gas in said collection conduit, and a bleed conduit connected to said collection conduit downstream of said second separator.

19. A carbon black separating and conveying system comprising a source of hot gaseous effluent containing gas, water vapor, and suspended carbon black at a temperature above 210° F., a discharge conduit connecting said source with an outlet downstream therefrom, a carbon black separator adapted to separate some of the carbon black from some of the gas and water vapor of said effluent and connected downstream of said source in said discharge conduit, said separator having an outlet conduit for carbon black, a collection conduit connected to said outlet conduit, a gas inlet conduit connecting said collection conduit to said discharge conduit at a point in said discharge conduit where the temperature of the hot gaseous effluent therein is above 210° F. to supply some of said gaseous effluent from said discharge conduit to said collection conduit, a gas blower connected in said collection conduit disposed to effect passage of the effluent therein and carbon black from said outlet conduit downstream through said collection conduit, a carbon black separator in said collection conduit downstream of said outlet conduit for separating some of the carbon black from some of the gas in said collection conduit, and a bleed conduit connected to said collection conduit downstream of said separator and connected to said discharge conduit upstream of said first separator.

20. A carbon black separating and conveying system comprising a source of hot gaseous effluent containing gas, water vapor, and suspended carbon black at a temperature above 210° F., a discharge conduit connecting said source with an outlet downstream therefrom, a plurality of first carbon black separators adapted to separate some of the carbon black from some of the gas and water vapor of said effluent and connected downstream of said source in said discharge conduit, each of said separators having an outlet conduit for carbon black, a collection conduit connected to a plurality of said outlet conduits, a star valve in each of said outlet conduits between the collection conduit and the respective separator disposed to regulate flow of carbon black therethrough, a gas inlet conduit connecting said collection conduit to said discharge conduit at a point in said discharge conduit where the temperature of the hot gaseous effluent therein is above 210° F. to supply some of said gaseous effluent from said discharge conduit to said collection conduit, a gas blower connected in said collection conduit disposed to effect passage of the effluent therein and carbon black from said outlet conduits downstream through said collection conduit, a second carbon black separator in said collection conduit downstream of said outlet conduits for separating some of the carbon black from some of the gas in said collection conduit, and a bleed conduit connected to said collection conduit downstream of said second separator and connected to said discharge conduit at a point upstream of at least one of said separators therein.

21. The process of collecting carbon black from a first hot gaseous effluent at a temperature above 210° F. containing gas, suspended carbon black and sufficient water to raise the dew point of said effluent to about 175° F. or greater which comprises the steps of passing said first effluent in a stream through a first dry carbon black separation zone, separating some of said carbon black in said first zone from said first effluent, passing the remainder of said first effluent out of said first zone in said stream and eventually discharging said first stream to the atmosphere, removing said first separated carbon black from said first zone as a flocculent first powder, passing a second gaseous stream obtained from said first stream so as to pick up and convey said first powder to a second dry carbon black separation zone, separating the major portion of said carbon black in said second zone from said second gaseous stream as a second powder, removing said second powder from said second zone and from said process as a product, returning said second gaseous stream from said second zone to said first stream upstream of said first zone, and so proportioning the flow of said streams and the conservation of heat throughout said process as to keep all the steps of said process above said dew point of the water present therein.

22. In the process of claim 21, the step of recycling some of said second stream coming from said second zone to said second stream going to said first zone, while maintaining all the steps of said process above said dew point of the water present therein.

References Cited in the file of this patent

UNITED STATES PATENTS

| | | |
|---|---|---|
| 2,062,358 | Frolich | Dec. 1, 1936 |
| 2,153,026 | Ringius | Apr. 4, 1939 |
| 2,368,828 | Hanson et al. | Feb. 6, 1945 |
| 2,391,863 | Bowen | Jan. 1, 1946 |
| 2,515,371 | Jewell | July 18, 1950 |
| 2,587,107 | Cade | Feb. 26, 1952 |

FOREIGN PATENTS

| | | |
|---|---|---|
| 504,459 | Belgium | July 31, 1951 |